United States Patent
Sheng et al.

(10) Patent No.: US 9,438,320 B2
(45) Date of Patent: Sep. 6, 2016

(54) ITERATIVE NONLINEAR PRECODING AND FEEDBACK FOR MULTI-USER MULTIPLE-INPUT MULTIPLE-OUTPUT (MU-MIMO) WITH CHANNEL STATE INFORMATION (CSI) IMPAIRMENTS

(75) Inventors: Hongsan Sheng, Chester Springs, PA (US); Yingxue K. Li, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 83 days.

(21) Appl. No.: 13/820,335

(22) PCT Filed: Sep. 1, 2011

(86) PCT No.: PCT/US2011/050176
§ 371 (c)(1),
(2), (4) Date: May 1, 2013

(87) PCT Pub. No.: WO2012/031098
PCT Pub. Date: Mar. 8, 2012

(65) Prior Publication Data
US 2013/0223555 A1 Aug. 29, 2013

Related U.S. Application Data

(60) Provisional application No. 61/379,009, filed on Sep. 1, 2010.

(51) Int. Cl.
*H04K 1/02* (2006.01)
*H04W 4/00* (2009.01)
(Continued)

(52) U.S. Cl.
CPC .......... *H04B 7/0417* (2013.01); *H04B 7/0452* (2013.01); *H04B 7/063* (2013.01);
(Continued)

(58) Field of Classification Search
USPC .......................................... 375/297; 370/338
See application file for complete search history.

(56) References Cited

U.S. PATENT DOCUMENTS

| | | | |
|---|---|---|---|
| 2003/0104808 A1* | 6/2003 | Foschini | H04B 1/123 455/423 |
| 2006/0149532 A1* | 7/2006 | Boillot | G10L 19/26 704/203 |

(Continued)

FOREIGN PATENT DOCUMENTS

| | | | |
|---|---|---|---|
| EP | 2357767 | * | 2/2010 |
| EP | 2271000 A1 | | 1/2011 |

(Continued)

OTHER PUBLICATIONS

Boccardi et al., "Multiuser eigenmode transmission for mimo broadcast channels with limited feedback", Signal Processing Advances in Wireless Communications, SPAWC, IEEE 8th Workshop, Jun. 1, 2007, 1-5.

(Continued)

*Primary Examiner* — Chieh M Fan
*Assistant Examiner* — Sarah Hassan
(74) *Attorney, Agent, or Firm* — Condo Roccia Koptiw LLP

(57) ABSTRACT

An iterative nonlinear preceding method based on, for example. Tomlinson-Harashima Preceding (THP) may be implemented in a MU-MIMO system to alleviate the performance degradation due to mismatches between actual Channel State Information (CSI) and impaired CSI available at a transmitter. In such a method, the effective channel may be fed back rather than a nonprecoded channel for a relay backhaul channel such that the iterative precoding and effective channel feedback may reduce the sensitivity to quantization errors and improve spectrum usage efficiency. Additionally, a Channel Quality Indicator (CQI) may be used to estimate a signal-to-interference-plus-noise (SINK) ratio based on quantization errors to accurately derive the effective channel quality of the receiver.

5 Claims, 11 Drawing Sheets

(51) Int. Cl.
*H04B 7/04* (2006.01)
*H04B 7/06* (2006.01)
*H04L 1/00* (2006.01)
*H04L 25/03* (2006.01)
*H04L 25/497* (2006.01)
*H04L 5/00* (2006.01)
*H04L 25/02* (2006.01)

(52) U.S. Cl.
CPC ......... *H04B 7/0626* (2013.01); *H04B 7/0632* (2013.01); *H04B 7/0654* (2013.01); *H04B 7/0663* (2013.01); *H04L 1/0026* (2013.01); *H04L 25/03343* (2013.01); *H04L 25/4975* (2013.01); *H04B 7/0465* (2013.01); *H04B 7/0478* (2013.01); *H04L 5/0007* (2013.01); *H04L 25/0202* (2013.01); *H04L 2025/03802* (2013.01)

(56) References Cited

U.S. PATENT DOCUMENTS

| | | | |
|---|---|---|---|
| 2006/0198459 A1* | 9/2006 | Fischer et al. | 375/267 |
| 2006/0210070 A1* | 9/2006 | Reznik | H04L 25/03343 380/33 |
| 2007/0211813 A1 | 9/2007 | Talwar et al. | |
| 2008/0198071 A1* | 8/2008 | Hwang | H04B 7/0447 342/373 |
| 2009/0010359 A1* | 1/2009 | Hwang | H04W 52/42 375/297 |
| 2010/0266054 A1* | 10/2010 | Mielczarek et al. | 375/260 |
| 2012/0314649 A1* | 12/2012 | Forenza | H04B 7/024 370/328 |
| 2014/0269642 A1* | 9/2014 | Forenza | H04J 11/003 370/337 |

FOREIGN PATENT DOCUMENTS

| | | |
|---|---|---|
| EP | 2357767 A1 | 8/2011 |
| WO | WO 2008/157167 A2 | 12/2008 |
| WO | WO 2009/130913 A1 | 10/2009 |
| WO | WO 2010/082884 A1 | 7/2010 |

OTHER PUBLICATIONS

Claire et al., "On the Achievable Throughput of a Multiantenna Gaussian Broadcast Channel", IEEE Transactions on Information Theory, vol. 49, No. 7, Jul. 2003, 1-16.

Trivellato et al., "On Transceiver Design and Channel Quantization for Downlink Multiuser MIMO Systems with Limited Feedback", IEEE Journal on Selected Areas in Communications, vol. 26, No. 8, Oct. 2008, 1494-1504.

Caire et al., "On The Achievable Throughput Of A Multiantenna Gaussian Broadcast Channel"IEEE Transactions on Information Theory, vol. 49, No. 7, Jul. 2003, 1-16.

* cited by examiner

ITERATIVE NONLINEAR PRECODING AND FEEDBACK FOR MULTI-USER MULTIPLE-INPUT MULTIPLE-OUTPUT (MU-MIMO) WITH CHANNEL STATE INFORMATION (CSI) IMPAIRMENTS

CROSS-REFERENCE

This application claims benefit under 35 U.S.C. §119(e) of provisional U.S. Patent Application No. 61/379,009, the disclosure of which is incorporated herein by reference.

BACKGROUND

Typically, wireless communication systems transmit and receive signals within a designated electromagnetic frequency spectrum. Unfortunately, the capacity of such a designated electromagnetic frequency spectrum tends to be limited. Additionally, the demand for wireless communication systems continues to increase and expand. As such, a number of wireless communication techniques have been developed to improve spectrum usage efficiency (and also improve the sensitivity of such systems to noise and interference and limit the power of transmissions) including various Multiple-Input Multiple-Output techniques that may handle transmissions involving multiple transmit and receive antennas. For example, Multi-User MIMO (MU-MIMO) systems can be implemented in wireless communication systems to establish (enable or as) closed-loop systems with improved spectrum usage efficiency. Currently, various MU-MIMO systems have been adopted in standards such as IEEE 802.16 and the 3rd Generation Partnership (3GPP) Long Term Evolution (LTE) platform, which is a step toward the 4th generation (4G) of radio technologies designed to increase the capacity and speed of mobile telephone networks. Although current MU-MIMO systems improve spectrum usage efficiency, such MU-MIMO systems tend to not fully utilize Channel State Information (CST) feedback and precoding techniques that can be implemented using, for example, a backhaul channel for a relay node (RN), user equipment (TIE), and/or evolved NodeB to further improve spectrum usage efficiency due, in part, to impairment or missing information associated with such CST.

SUMMARY

A method and/or system for implementing iterative nonlinear precoding and feedback may be implemented in a MU-MIMO system. For example, an effective precoded channel may be estimated and quantized at a relay node. In one embodiment, quantization errors associated with the effective precoded channel may be suppressed such that quantized estimates without such quantization errors may be obtained. After suppressing the quantization errors, at least one of the following: the quantized estimates of the effective precoded channel; the quantization errors; a square amplitude of the quantization errors; and a Channel Quality Indicator (CQI) generated based on the quantization error may be fed back to, for example, an eNodeB (eNB).

According to another embodiment, the eNB may receive at least one of the following: the quantized estimates of the effective precoded channel; quantization errors associated with the effective precoded channel; a square amplitude of the quantization errors; and the Channel Quality Indicator (CQI) generated based on the quantization error. The eNB may concentrate the quantized estimates, apply a decomposition to the quantization estimates, and estimate a signal-to-interference-plus-noise ratio (SINK) of a relay node (RN) using one or more of: the quantized estimates; the quantization error, and the CQI. The eNB may also precede a data stream; apply a modulo operation to the precoded data stream to generate data symbols precede the data symbols to generate a signal; and transmit the signal through a channel matrix.

In another example embodiment, the RN may receive the signal that may include data and/or symbols transmitted through the channel matrix from the eNB. Upon receipt of the signal RN may apply a filter to the received signal and perform a modulo operation on the filtered signal to remap the symbols or data included therein to an original constellation for a subframe. The RN may then detect the symbols associated with the signal after the modulo operation may have been performed.

BRIEF DESCRIPTION OF THE DRAWINGS

A more detailed understanding may be had from the following description, given by way of example in conjunction with the accompanying drawings wherein.

DETAILED DESCRIPTION

The presently disclosed subject matter relates to wireless cellular communication systems, in particular, CSI feedback and precoding methods for multi-user MIMO systems. For MU-MIMO systems in which receivers feedback quantized CSI to the transmitter, an iterative THP-based nonlinear precoding technique is provided to suppress impact of quantization errors on precoded effective channel, and to alleviate performance degradation due to mismatch between actual CSI and transmitter's estimate of the CSI. CQI generation is provided for transmitters to estimate receivers' SINR. The presently disclosed subject matter can address a MIMO broadcast channel where the transmitter has imperfect knowledge of the MIMO channel due to CSI limited feedback from the receivers.

Figure 1A:
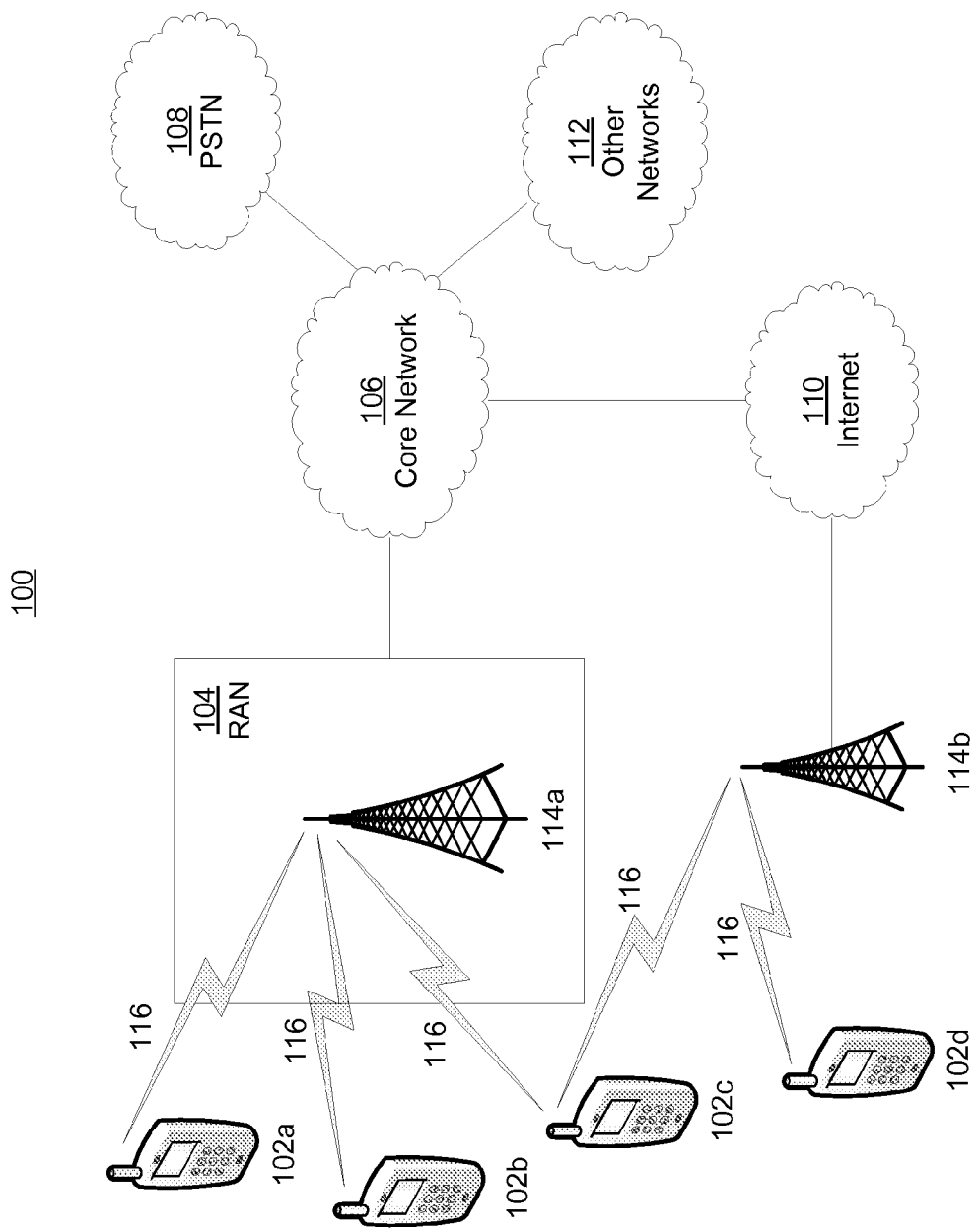
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102h, 102c, 102d may be configured to transmit and/or receive wireless signals and may include user equipment (UE), a relay node, a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114h may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114h may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected, base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SCS-DMA, and the like. For example, the base station 114a in the RAN 104 and the WTRUs 102a, 102b, 102c may implement a radio technology such as Universal Mobile Telecommunications System (UMTS) Terrestrial Radio Access (URA), which may establish the air interface 116 using wideband CDM WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 80216 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication, with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol, UP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
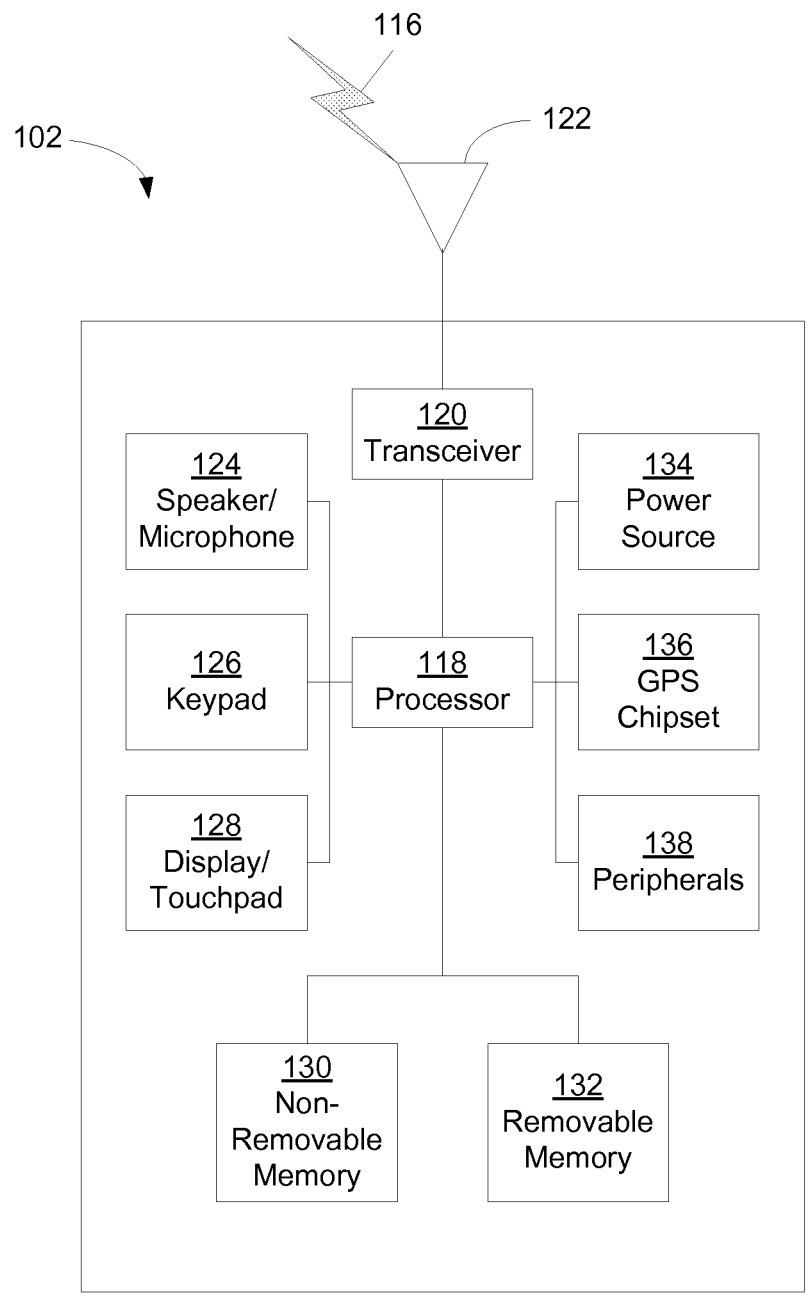
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1E as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple FLATS, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
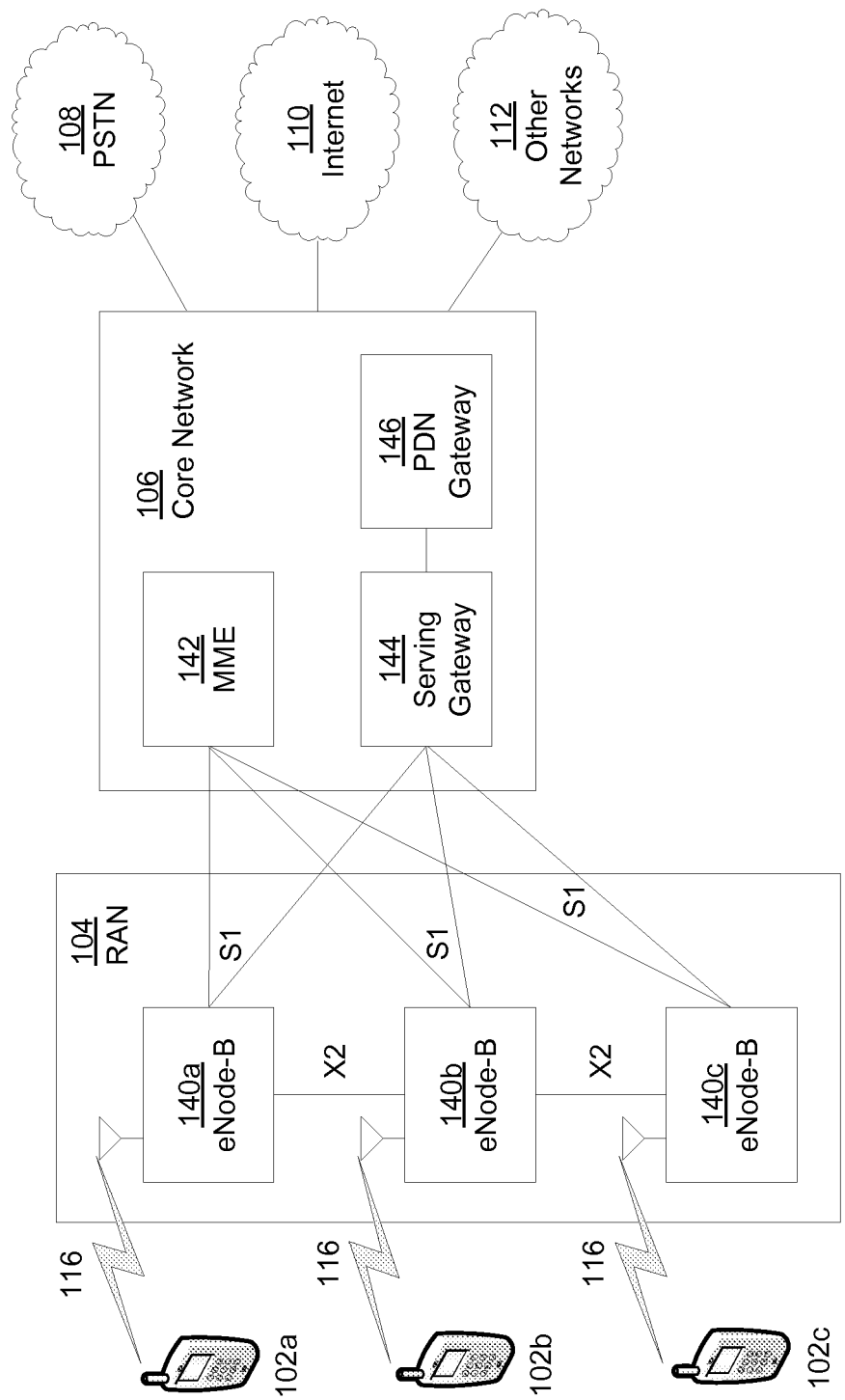
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

According to one embodiment, a WTRU such as the WTRUs 102a, 102b, 102c, 102d may include a UE and a relay node (RN) such as a fixed relay node that may communicate with each other via, for example, an interface link. Alternatively, the WTRU such as the WTRUs 102a, 102b, 102c, 102d may include a UE and the RAN 104 and/or the base station 114a, 114b may include a RN that may communicate with each other via, for example, an interface link.

The RN may be a fixed RN that may receive data and/or signals, process such data and/or signals including demodulate and decode such data and/or signals, apply error correction to such data and/or signals, and the like and then retransmit such data and/or signals as new data and/or signals.

The RN and/or the WTRU or UE may further communicate with an evolved NodeB ("an eNodeB" or "an eNB" as described above) that may be included in the base station 114a, 114b or may be a separate component of the RAN 104 such as the eNodeBs 140a, 140b, 140c shown in FIG. 1C. For example, in one embodiment, the UE may transmit data and/or signals that may be received and/or processed by the RN. The RN may then transmit the received and processed data and/or signals to the eNB, for example, as new data and/or a signal. According to another embodiment, the UE may be in communication with the eNB such that the UE may transmit data and/or a signal directly to the eNB.

According to an example embodiment, the WTRU or UE such as the WTRUs 102a, 102b, 102c, 102d and/or the RN may communicate or interface with the eNB such as eNodeBs 140a, 140b, 140c or an eNB included in the base station 114a, 114b via a backhaul channel. According to an example embodiment, the backhaul channel for the RN or UE to communicate or interface with, for example, the eNB may include unique characteristics such as a clear LOS path and quasi-static flat fading. As such, a RN such as a fixed RNs or a UE with a quasi-static relay backhaul channel such as the RNs and UEs disclosed herein may provide opportunities for UEs, RNs and/or eNBs to accommodate more sophisticated Nonlinear Precoding (NLP) schemes such as Tomlinson-Harashima Precoding (THP), a feasible implementation of optimal Dirty Paper Coding (DPC), and the like. Such sophisticated NLP schemes may be used by or implemented in the UE, RN, and/or eNB to improve spectrum usage efficiency in a communication system such as the communication system 100 shown in FIG. 1A that may include the RN, UE, and/or eNB.

For example, the UE, RN, and/or eNB may be included in a communication system such as the communication system 100 shown in FIG. 1A-1C that may implement Multi-User MIMO (MU-MIMO) ("a MU-MIMO system"). Using the backhaul channel for the RN and/or UE, the MU-MIMO system may use Channel State Information (CSI) or other unique characteristics of the backhaul channel and/or sophisticated Nonlinear Precoding (NLP) schemes such as Tomlinson-Harashima Precoding (THP), a feasible implementation of optimal Dirty Paper Coding (DPC), and the like to improve spectrum usage efficiency.

In an ideal MU-MIMO system, information theory indicates that with CSI at the transmitter (CSIT) of, for example, the UE, RN, and/or eNB, the optimum transmit strategy for the MU-MIMO broadcast channel may be equivalent to DPC that may be used in a THP scheme. However, in an actual MU-MIMO system, the LIST may not include perfect or full information or may not be perfectly or fully known due to impairments or missing values in the CSI that may be dominated by quantization errors. As such, actual MU-MIMO systems tend to not use THP or other NLP precoding schemes that may use DPC as such schemes may be very sensitive to CSI impairments or missing values.

To enable use of NLP including THP precoding schemes that may use DPC in a MU-MIMO system with a UE, RN, and eNB, disclosed herein is an iterative method or technique for suppressing quantization errors of CSI or CSIT such that CSI or CSIT and NLP including THP precoding schemes that may use DPC may be used thereby improving spectrum usage efficiency. For example, in one embodiment, an effective channel may take into account a feedforward precoding matrix (or matrices). The effective channel may be quantized and fedback such that the feedforward precoding matrix (or matrices) may be adjusted iteratively. The quantized effective channel may include quantization errors. For example, the upper right triangular of the effective channel matrix may have small, but non-zero elements ("quantization errors") that may lead to inter-relay interference and spectrum usage inefficiencies.

According to one embodiment, the method or technique disclosed herein may be a THP scheme that may suppress the impact of small, but nonzero elements ("quantization errors") in the upper right part or triangular of the effective channel matrix such that DPC may be used in a MU-MIMO system thereby improving interference and spectrum usage efficiency. For example, to suppress such quantization errors, the elements at the upper right part or triangular of the effective precoded channel matrix may be scaled to the same level as the elements at the upper left part or triangular of the effective precoded channel matrix before quantization. After quantization, the elements may then reversely scaled back to the original power level.

In an example embodiment, such a NLP or THP scheme with the scaling procedure described above may be successively performed with several iterations between, for example, an eNB, RN, and/or UE. At each iteration, the quantization error may be effectively reduced due to the constellation change before quantization as described above such that the successive iteration adjusts the effective channel matrix as a lower left triangular matrix and feedforward precoding matrix as an identity matrix. Along with quantized effective channels values or estimates, CQI values equal to the square amplitude of the quantization error may also generated based on the schemes and procedures described herein. In one embodiment, the CQI values may then fedback to the eNB to estimate an SINR for one or more receivers.

Iterative Nonlinear Precoding (NLP) and Feedback Method

Figure 2A:
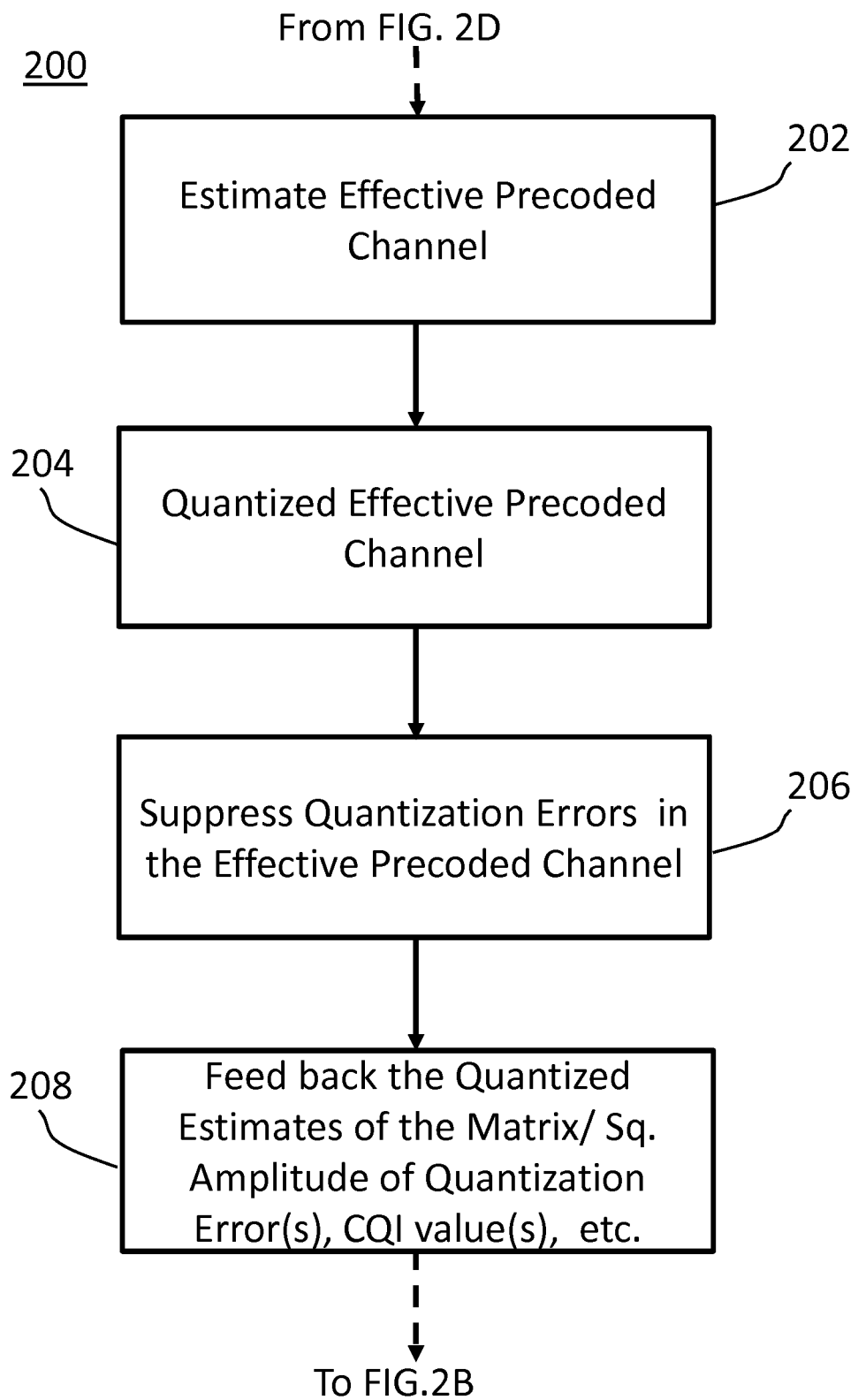
FIGS. 2A-2D illustrate an example embodiment of a method or procedure for implementing iterative nonlinear precoding and feedback.

FIGS. 2A-2D illustrate an example embodiment of a method or procedure 200 for implementing iterative nonlinear precoding and feedback in a MU-MIMO system. As shown in FIG. 2A, an effective preceded channel may be estimated at 202 and quantized at 204. For example, as described above, a wireless communication system may include one or more RNs. Each RN may estimate an effective precoded channel, $L_k$ at 202 and subsequently quantize the effective precoded channel, $\tilde{L}_k$, at 204.

Quantization errors that may exist in the effective preceded channel may be suppressed at 206. For example, each of the RN may suppress small, but nonzero elements that may be generated or result from quantization ("the quantization errors) of the effective precoded channel. The quantization errors may be suppressed at 206 by scaling up the elements at the right interference part or triangular of the effective precoded channel matrix to a similar or same power level as the elements at the left interference part or triangular of the effective precoded channel before quantization (or vice versa) and reversely scaling back the elements to their original power level after quantization. In one embodiment, the elements may be scaled using a scalar or booster generated based on feedback from, for example, an eNB or UE or other component of the wireless communication system. According to another embodiment, the elements may be scaled using a fixed value or number.

At 208, the quantized estimates of the effective precoded channel, $\tilde{L}_k$, the square amplitude of the quantization error(s), CQI values(s), quantization error(s), and any other suitable information that may be used to implement an NLP scheme such as THP in the MU-MIMO system may be fed back and/or transmitted. For example, a RN may feed back or transmit at least the quantized estimates of the effective precoded channel, $\tilde{L}$, and the square amplitude of the quantization error $\|e_k(1)\|^2$ for a first iteration to the eNB at 208. For subsequent iterations, the RN may feed back or transmit CQI values to the eNB at 208. For example, for each iteration after the first iteration or iterations if l>1, the RN may feed back a value based on $\|e_k(l)\|^2 - [e_k^H(l)e_k(l)]_{k,k}$ as CQI values or $\tilde{L}$(CQI values) at 208.

Figure 2B:
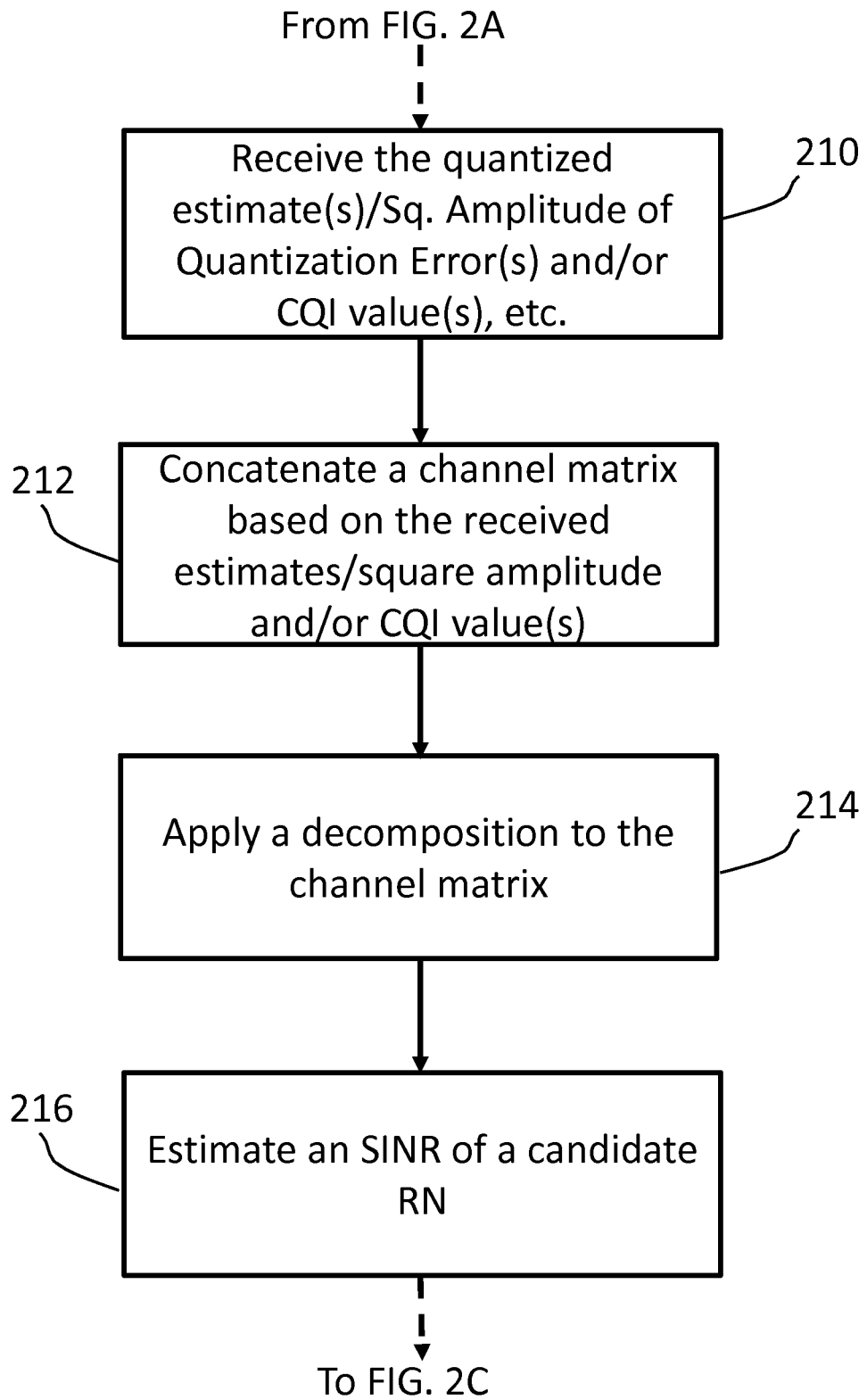

As shown in FIG. 2B, the quantized estimate(s) of the effective precoded channel, $\tilde{L}_k$, the square amplitude of the quantization error(s), CQI values(s), quantization error(s), and any other suitable information that may be used to implement an NLP scheme such as THP in the MU-MIMO system that may be fed back and/or transmitted by the RN may be received at 210. For example, the eNB may receive the quantized estimates of the effective preceded channel, k, the square amplitude of the quantization error(s), CQI values(s), quantization error(s), and any other suitable information from the RN at 210.

At 212, a channel matrix $\tilde{L}$ based on, for example, the quantized estimate(s) of the effective preceded channel(s), $\tilde{L}_k$, may be concatenated. For example, the eNB may concatenate at 212 a channel matrix $\tilde{L}$ based on, for example, the quantized estimate(s) of the effective preceded channel(s), $\tilde{L}_k$, received from the RN at 210.

A decomposition may then be applied to the channel matrix at 214. For example, the eNB may apply a LQ decomposition, $\tilde{L}=\tilde{G}\tilde{Q}$, to the channel matrix $\tilde{L}$. According to one embodiment, the LQ decomposition may be applied using a Gram-Schmidt orthogonalization.

After applying the LQ decomposition at 214, a signal-to-interference-plus-noise ratio (SINR) of one or more RNs may be estimated at 216. For example, at 216, the eNB may estimate an achievable SINE, of one or more candidate RNs for the first iteration and subsequent l-th iteration(s) respectively using the quantization error, CQI values, quantized estimates, and the like received at 210. According to one embodiment, the eNB may estimate the achievable SINR of a candidate RN using, for example, Equations 20 and 21 shown and described below. After estimating the SINR, a sum rate throughput may be calculated for RN selection and RN ordering may be permutated to further improve the accuracy of an expected throughput. In such an embodiment, the sum rate throughput and RN ordering may be used to schedule CSI CQI for a LTE.

Figure 2C:
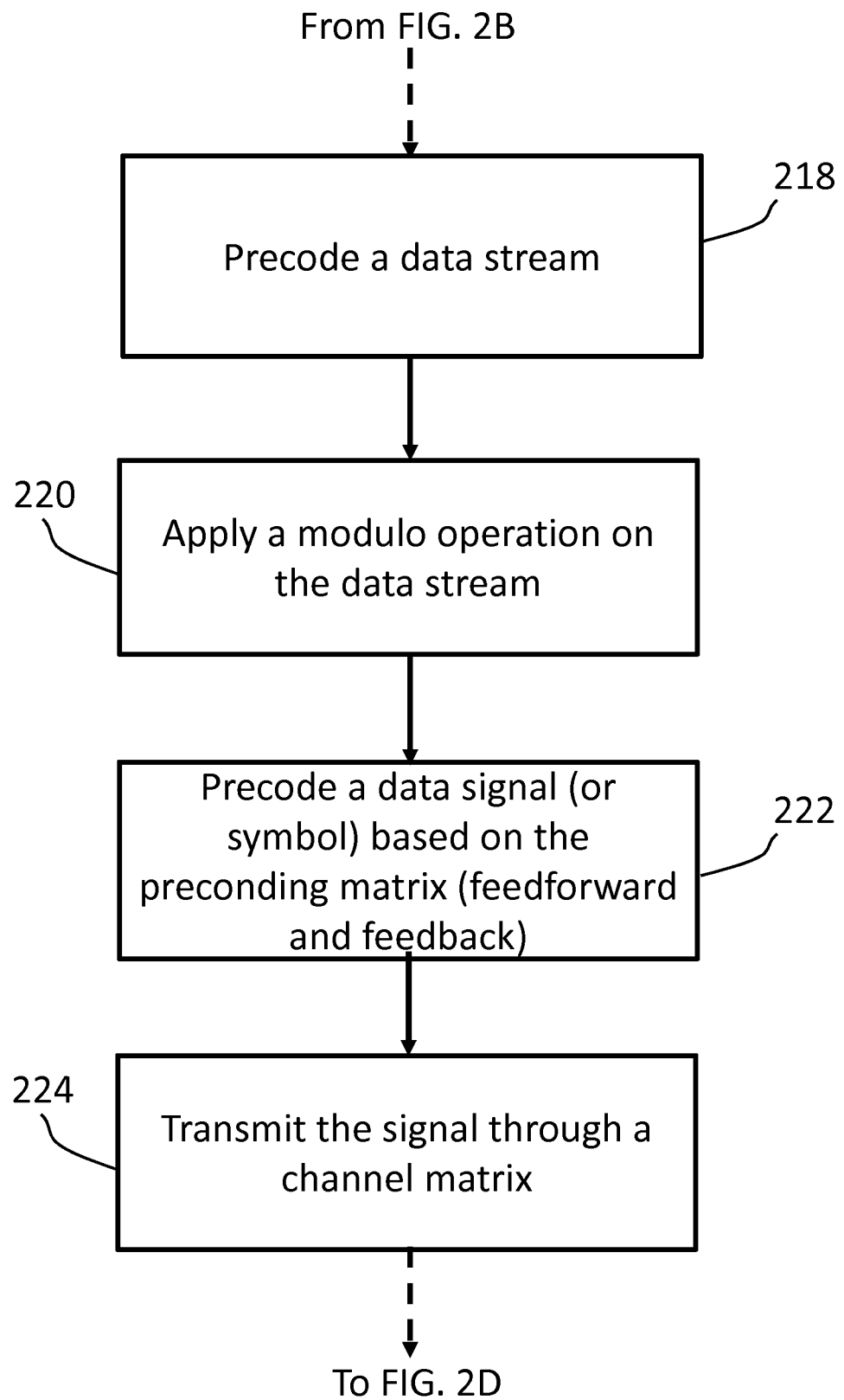

As shown in FIG. 2C, a data stream may be precoded successively at 218. For example, the eNB may precode successively a data stream from a to v by applying a lower left triangular matrix $\hat{G}$ or a predistortion at 218

After precoding the data stream at 218, a modulo operation may be applied to the precoded data stream at 220. For example, in one embodiment, the eNB may apply or perform a modulo operation on the precoded data stream v to obtain or generate data b including data symbol(s). According to an embodiment, the modelo operation may be applied or performed on the precoded data stream v to bring back the generated data b to be within the constellation boundaries and to make sure the power may be constant. The modulo operation may be modeled as p=v−a in one embodiment.

As further shown in FIG. 2C, at 222, the data b (including symbol(s)) may be precoded to signal x. For example, the eNB may precode the data b including the data symbol(s) to generate signal x using a compilation of the fed forward and fed back iterative matrices for the effective precoding channel(s) that may be represented by an iterative precoding matrix $W(l)=\tilde{Q}^H(1)\tilde{Q}^H(2)\ldots\tilde{Q}^H(l)$, which will be described in more detail below. In one embodiment, the eNB may also precode the data b using the iterative precoding matrix $W(l)=\tilde{Q}^H(1)\tilde{Q}^H(2)\ldots\tilde{Q}^H(l)$ to enable the transmission of the generated signal x on the channel.

After precoding the data b to generate signal x, the signal may be transmitted through, for example, a channel matrix H at 224. For example, the eNB may transmit the signal x, at 224, through a channel matrix H to the RNs.

Figure 2D:
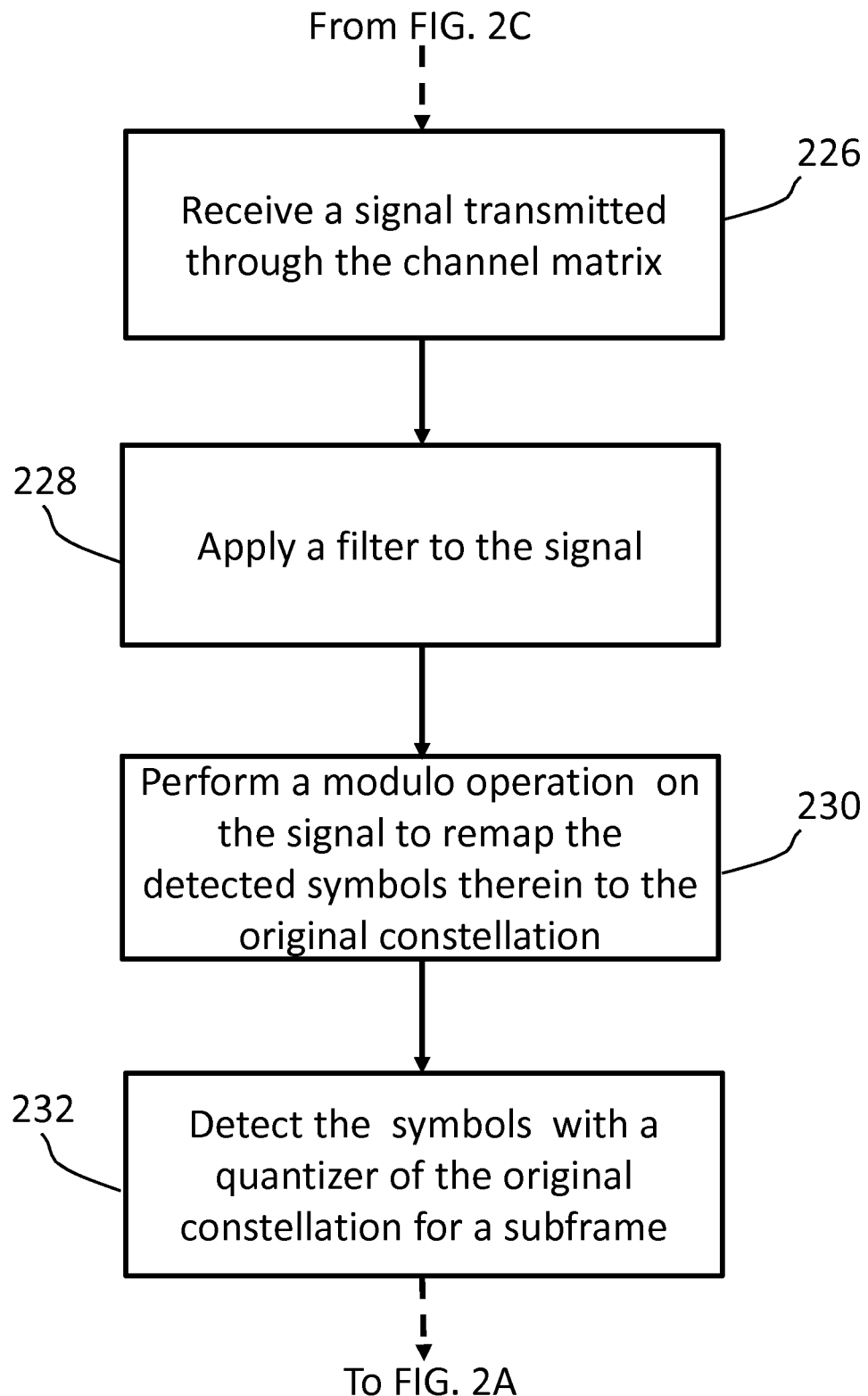

As shown in FIG. 2D, a signal $y_k$ that may result from or be based on the signal x being transmitted through channel matrix H may be received. In particular, according to one embodiment, each RN may receive a signal $y_k$ resulting from and/or being based on signal X being through channel matrix H at 226.

After receiving the signal $y_k$, at 226, a filter $F_k$ may then be applied to the received signal $y_k$ at 228. Specifically, in an embodiment, at 228, each RN may apply a filter $F_k$ to their respective signal $y_k$ received at 226.

At 230, a modulo operation may be performed after applying the filter at 228 to remap the symbols included in (and as described below detected from) signal $y_k$ to the original constellation. For example, after applying the filter $F_k$ to the received signal $y_k$, each RN may perform a modulo operation at 230 on the filtered signal $y_k$ to remap the symbols associated therewith to the original constellation. According to one embodiment, a symbol-by-symbol modulo sequence may not be available to be performed at 230, and, as such, a blind modulo (with, for example, no modulo side information) may be applied by each RN.

The symbols associated with signal $y_k$ may then be detected with a quantizer of the original constellation for a subframe at 232. For example, after remapping the symbols associated with signal $y_k$ to the original constellation at 230, each RN may detect the received symbols using a quantizer of the original constellation for a subframe. According to an example embodiment, the detected symbols may be used as a target of communications between the UE, RN, eNB, and/or wireless communication network and any other components thereof.

According to an example embodiment, the iterative NLP method 200 may be repeated for subsequent iterations. For example, as described above, the iterative NIT method 200 may be performed for a first iteration and repeated for subsequent iterations such that after detecting the symbols at 232 in one iteration, a subsequent iteration may start estimating an effective precoded channel at 202.

Additional embodiments or information associated with the iterative NLP method 200 may be described below with regard to a system model, iterative method that may be implemented in the system model, and/or calculation of a CQI in the system model.

System Model for an Iterative NLP Method

For a MIMO broadcast channel in a MU-MIMO system, an eNB with $N_t$ antennas transmits to K decentralized relay nodes (chosen from total K RNs), each with $N_r$, receive antennas. The baseband received signal by the k-th RN is as follows:

$$y_k = H_k x + n_k, \; k=1,\ldots,K \quad \text{(Equation 1)}$$

where $y_k=[y_{k1},\ldots,y_{kN_r}]^T\in\mathbb{C}^{N_r\times 1}$, $H_k\in\mathbb{C}^{N_r\times N_t}$ may be the channel matrix between the eNB and, the k-th RN, $x\in\mathbb{C}^{N_T\times 1}$ may be the overall transmitted signal vector, and $n_k\in\mathbb{C}^{N_T\times 1}$ may be the complex additive white Gaussian noise at the receive antenna of the k-th RN with power $\sigma_n^2$, i.e., $E\{n_k n_k^H\}=\sigma_n^2 I_{N_T}$. The input may be subject to the total transmitted average power constraint $E\{tr(xx^H)\}\leq P=\sum_{k=1}^K P_k$.

Figure 3:
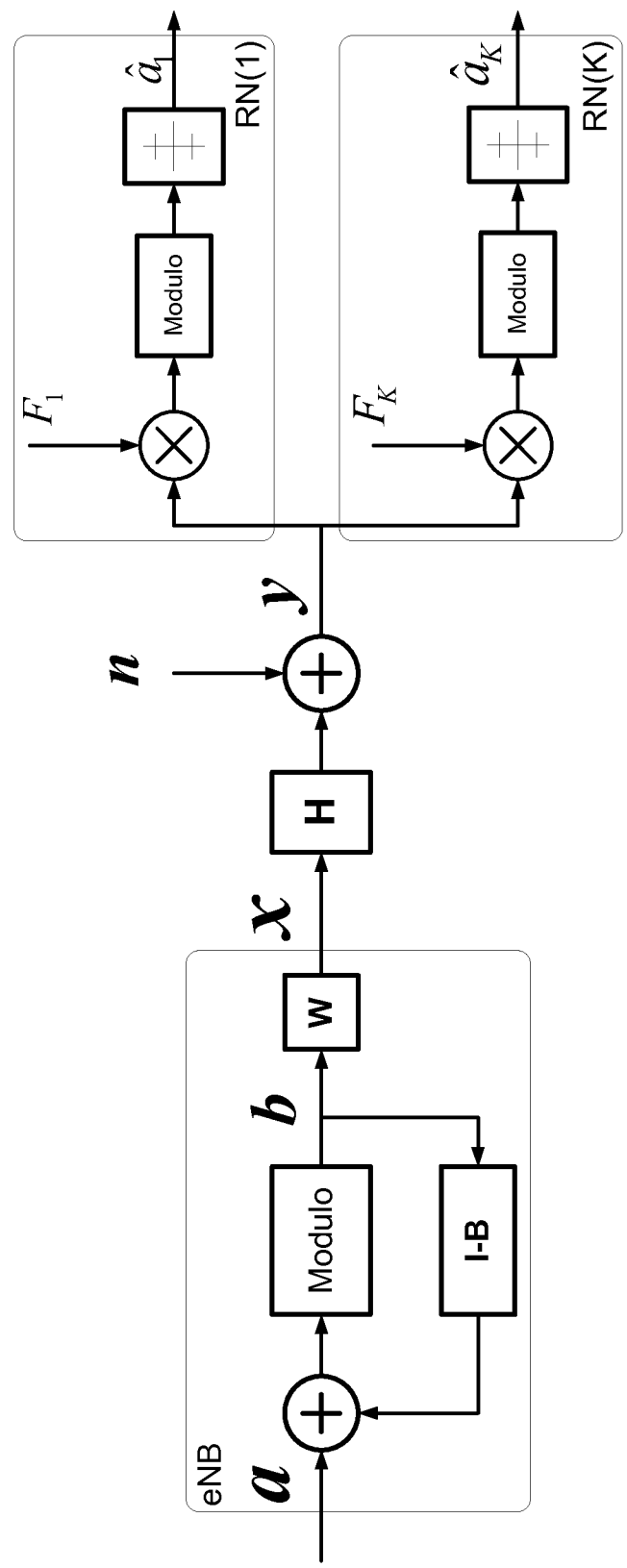
FIG. 3 illustrates a block diagram of an example embodiment of a THP transceiver structure.

In one embodiment, the transmitted vector or signal x may be generated by using a nonlinear Tomlinson-Harashima precoding (THP) scheme or technique. As shown in FIG. 3, interference pre-subtraction and channel spatial equalization may be performed at the eNB using a feedback precoding matrix B and a feedforward precoding matrix W. The feedforward precoding matrix W may be used to suppress inter-relay interference caused by higher indexed relay nodes, while the feedback matrix B may be used to reduce or eliminate the interference caused by lower indexed relay nodes.

In a conventional THP scheme, a RN quantizes $H_k$ to $\tilde{H}_k$ which is sent back to eNB. At eNB, a concatenated channel matrix of the selected RNs may be reconstructed $\tilde{H}=[\tilde{H}_1^T,\ldots,\tilde{H}_K^T]^T$, and LQ decomposition may be applied by Gram-Schmidt orthogonalization to the rows of $\tilde{H}$, $$\tilde{H}=\tilde{G}\tilde{Q} \quad \text{(Equation 2)}$$

where $\tilde{G}\in\mathbb{C}^{(KN_T)\times m}$ is a lower left triangular matrix, and may be a matrix with orthonormal rows, $\tilde{Q}\tilde{Q}^H=I\in\mathbb{R}^{m\times m}$. According to one embodiment, there may be a total of $m=\sum_{k=1}^K m_k\leq N_t$ streams to K RNs, with the row rank of $H_k$ as $m_k$. The THP scheme or technique may apply feedforward precoding matrix $W=\tilde{Q}^H$ and feedback precoding matrix $B=\tilde{D}^{-1}\tilde{G}$, where $\tilde{D}=[\tilde{D}_1^T,\ldots,\tilde{D}_K^T]^T$ may be a block diagonal matrix for scaling with $g_{k,i}$ as the diagonal element of matrix $G\in\mathbb{C}^{(KN_T)\times m}$ for the i-th stream and the k-th RN.

Figure 4:
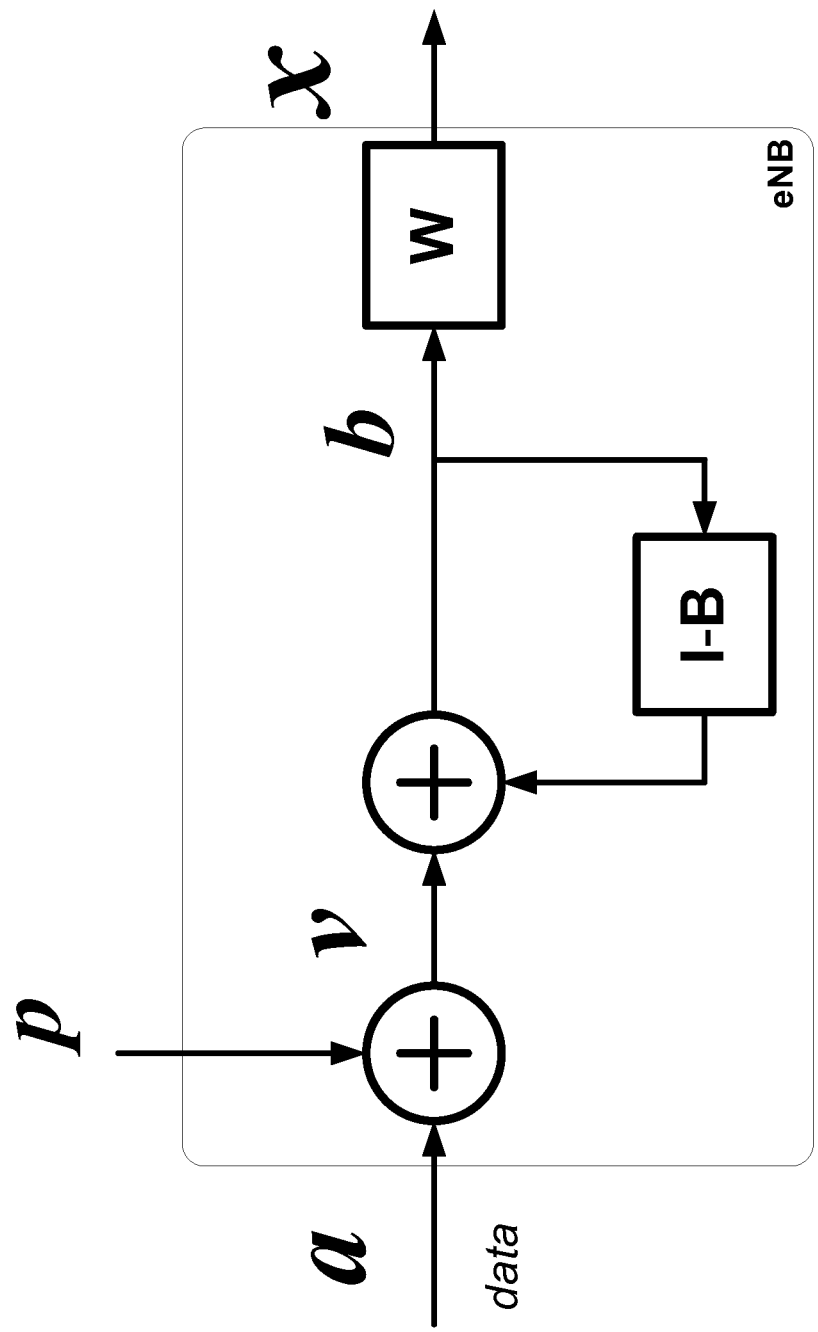
FIG. 4 illustrates a block diagram of an example embodiment of an equivalent linear model for an eNB.

The data symbols for the k-th RN are collected in the data vector $a_k=[a_{k1},\ldots,a_{km_k}]^T\in\mathbb{C}^{m_k\times 1}$ and the overall data vector is $a=[a_1^T,\ldots,a_K^T]^T\in\mathbb{C}^{m\times 1}$. In the absence of the modulo operation, the output symbols of the feedback loop in FIG. 3 may be generated successively according to the following relation:

$$b_k = a_k - \sum_{j=1}^{k-1}[B]_{k,j}b_j \quad \text{(Equation 3)}$$

where $[B]_{k,j}$ denotes the element at the intersection of the k-th row and j-th column of the matrix B. At the k-th step, only the previously precoded symbols are subtracted. The summation in (Equation 3) may indicate that magnitude of $b_k$ may grow beyond the boundaries of constellation region $\mathcal{A}$. The role of the modulo operation corresponds to bring the magnitude back inside the boundaries of $\mathcal{A}$. If $a_k$ is M-ary QAM signal, mathematically, the effect of the modulo operation is equivalent to the addition of some complex quantities integer multiples of $2\sqrt{M}$ to the real and imaginary part of $a_k$. Based on such an observation, an equivalent linear model of the eNB may be generated or obtained that may not involve a modulo operation. FIG. 4 illustrates an example embodiment of an equivalent linear structure by replacing modulo with an additive modulo sequence $p\in\mathbb{C}^{m\times 1}$, v=a+p.

For such an equivalent model, $b \in \mathbb{C}^{m \times 1}$ may be linearly related to the modified data vector $v \in \mathbb{C}^{m \times 1}$, $$b = B^{-1} v \quad \text{(Equation 4)}$$

Following the feedback processing, the vector v is then linearly precoded to produce the vector of the transmitted signals $$x = Wb \quad \text{(Equation 5)}$$

Iterative Nonlinear Precoding

As shown in FIG. 3, with linear feedforward precoding matrix $W = \tilde{Q}^H$, the effective channel matrix HW may be a lower triangular matrix with perfect CSI at the eNB. In the presence of quantization errors, the upper right triangular of the effective channel matrix has small but nonzero elements resulting in inter-relay interference. Quantization error(s) may be suppressed by changing the constellation of the upper right triangular to alleviate the sensitivity to quantization errors. Rather than sending back the quantized actual channel matrix, the effective channel HW may be quantized and fed back by taking into account the nature of the upper right triangular area.

According to one embodiment, each RN described herein may have one receive antenna. As such, at the l-th iteration for the transmission from eNB to RNs, the effective channel matrix may be represented by $$L(l) \triangleq HW(l-1) \in \mathbb{C}^{K \times K}, \, l=1, \ldots, L \quad \text{(Equation 6)}$$

where $L(1) \in \mathbb{C}^{K \times N_t}$ and $L(l) \in \mathbb{C}^{K \times K}$ for $l>1$, and $W(l-1)$ may be the feedforward precoding matrix in the last iteration (l−1). Additionally, the quantization error for the l-th iteration may be represented as e(l), i.e., $$L(l) = \tilde{L}(l) + e(l) \quad \text{(Equation 7)}$$

where $\tilde{L}(l)$ may be the quantized channel matrix of L(l). The quantized channel matrix $\tilde{L}(l)$ may then fed back from RN to eNB for precoding.

At the eNB, LQ decomposition may then be applied on $\tilde{L}(l)$, $$\tilde{L}(l) = \tilde{G}(l)\tilde{Q}(l) \quad \text{(Equation 8)}$$

with $\tilde{G}(l) \in \mathbb{C}^{K \times K}$ for all l, $\tilde{Q}(1) \in \mathbb{C}^{K \times N_t}$, and $\tilde{Q}(l) \in \mathbb{C}^{K \times K}$ for $l>1$. $\tilde{G}(l)$ may be used to obtain or generate the feedback precoding matrix B(l)

$$B(l) = \tilde{D}^{-1}(l)\tilde{G}(l) \quad \text{(Equation 9)}$$

and $\tilde{Q}(l)$ may be used to obtain or generate the iterative feedforward precoding matrix W(l)

$$W(l) = W(l-1)\tilde{Q}^H(l), \, l=1, \ldots, L \quad \text{(Equation 10)}$$

where $W(0) = I \in \mathbb{C}^{N_t \times N_t}$. When l may be large enough and after the iteration precoding operation, the matrix $\tilde{Q}(l)$ may be close to an identity matrix, and HW(l) maybe a lower left triangular matrix.

The received signal vector at the l-th iteration may be $$y(l) = HW(l)b + n = HW(l-1)\tilde{Q}^H(l)b + n = L(l)\tilde{Q}^H(l)b + n \quad \text{(Equation 11)}$$

or, when substituting (Equation 8) into (Equation 11), $$y(l) = \tilde{G}(l)b + e(l)\tilde{Q}^H(l)b + n \quad \text{(Equation 12)}$$

When the successive DPC precoding may be applied, i.e., $b = \tilde{G}^{-1}(l)\tilde{D}(l)v$, the received signal may be given $$y(l) = \tilde{D}(l)v + e(l)\tilde{Q}^H(l)b + n \quad \text{(Equation 13)}$$

The received signal for the k-th RN, may be represented by $$y_k(l) = \tilde{D}_k(l)v + e_k(l)\tilde{Q}^H(l)b + n_k \quad \text{(Equation 14)}$$

The k-th RN receiver may apply a linear filter $F_k \in \mathbb{C}^{m_k \times N_r}$ to the received signal for detection $$r_k(l) = \quad \text{(Equation 15)}$$
$$a_k + F_k(l)e_k(l)\tilde{Q}_k^H(l)b_k + \sum_{\substack{j=1, \\ j \neq k}}^{K} F_k(l)e_k(l)\tilde{Q}_j^H(l)b_j + F_k(l)n_k$$

where $\tilde{Q}_k$ may be the k-th row of $\tilde{Q}$. For a special, case that each RN has one receive antenna, $F_k(l) = \tilde{g}_{k,1}^{-1}(l)$, (Equation 15) may become $$r_k(l) = \quad \text{(Equation 16)}$$
$$a_k + \tilde{g}_{k,1}^{-1}(l)e_k(l)\tilde{q}_k^H(l)b_k + \tilde{g}_{k,1}^{-1}(l)\sum_{\substack{j=1, \\ j \neq k}}^{K} e_k(l)\tilde{q}_j^H(l)b_j + \tilde{g}_{k,1}^{-1}(l)n_k$$

CQI Calculation with an Iterative NLP Method

As a result of the nonlinear modulo operation, signal power may be kept same, i.e., $E\{a_k^H a_k\} = E\{b_k^H b_k\} = P_k$. When each RN has one receive antenna, the receive signal power may be $$P_s(k) = |1 + \tilde{g}_{k,1}^{-1} e_k \tilde{q}_k^H|^2 P_k$$

where $\tilde{q}_k \in \mathbb{C}^{1 \times N_t}$ may be a vector of the k-th row of the matrix $\tilde{Q} \in \mathbb{C}^{K \times N_t}$. The inter-RN interference power may be $$P_I(k) = \frac{P_k}{|\tilde{g}_{k,1}|^2} \sum_{\substack{j=1, \\ j \neq k}}^{K} |e_k \tilde{q}_j^H|^2$$

and the noise power may be $$P_n(k) = \frac{\sigma_n^2}{|\tilde{g}_{k,1}|^2}$$

Thus, the effective SINR value of the k-th RN may be estimated, generated, or obtained by $$SINR_k(l) = \frac{P_s(k)}{P_I(k) + P_n(k)} = \frac{|\tilde{g}_{k,1}(l) + e_k(l)\tilde{q}_k^H(l)|^2}{\sum_{\substack{j=1, \\ j \neq k}}^{K} |e_k(l)\tilde{q}_j^H(l)|^2 + \frac{1}{P_k/\sigma_n^2}} \quad \text{(Equation 17)}$$

where $\tilde{g}_{k,1}$ is the k-th diagonal element of the lower triangular matrix $\tilde{G}$.

As a RN typically does not have knowledge of the precoding matrix $\tilde{Q}$ (including all selected RNs' precoding vector, $\tilde{q}_k$, k=1, . . . , K), the eNB may compute (Equation 17) by having the RNs report the quantization error vector $e_k$, which may result in significant overhead increase. As such, good estimates of the k-th RN SINR in (Equation 17) may be generated and/or found to find a balance in such overhead increase.

For example, if users selected for transmission may be assumed to have nearly orthogonal reported channels, then the k-th error vector may be orthogonal to the k-th precoding vector, i.e., $e_k \tilde{q}_k^H \approx 0$. As such, (Equation 17) may become $$SINR_k \approx \frac{|\tilde{g}_{k,1}|^2}{\sum_{\substack{j=1, \\ j \neq k}}^{K} |e_k \tilde{q}_j^H|^2 + \frac{1}{P_k / \sigma_n^2}} \quad \text{(Equation 18)}$$

Focusing on the sum in the denominator, taking the expectation with respect to the interference term and noticing that the SINR function may be monotonic with this term, Jensen's inequality may yield the following lower-bound $$E\{SINR_k\} \geq \frac{|\tilde{g}_{k,1}|^2}{E\left\{\sum_{\substack{j=1, \\ j \neq k}}^{K} |e_k \tilde{q}_j^H|^2\right\} + \frac{1}{P_k / \sigma_n^2}} \quad \text{(Equation 19)}$$

With no iteration, l=1, the unit row vector $e_k$ and $\tilde{q}_j$ may both be isotropically distributed on the ($N_t$−1)-dimensional hyperplane orthogonal to $\tilde{q}_k$. Moreover, as the directional distribution of $\tilde{q}_j$ on this hyperplane depends only on $\tilde{q}_i$ for i=1, ..., K, i≠k, i≠j, it may follow that $\tilde{q}_j$ may be independent of the quantization error $e_k$ for any j≠k. Hence, the inner product $|e_k \tilde{q}_j^H|$ is Beta-distributed with parameters (1, $N_t$−1) and mean value of $1/N_t$. Then (Equation 19) may become $$E\{SINR_k\} \geq \frac{|\tilde{g}_{k,1}|^2}{\frac{K-1}{N_t}\|e_k\|^2 + \frac{1}{P_k / \sigma_n^2}} \triangleq \gamma_k^{(1)} \quad \text{(Equation 20)}$$

Such an operation may be equivalent to treating $\tilde{q}_j^H \tilde{q}_j$ as a diagonally-dominant matrix (a matrix whose diagonal elements are much larger than the off-diagonal ones), $$\tilde{q}_j^H \tilde{q}_j \approx \frac{1}{N_t} I \in C^{N_t \times N_t}.$$

A RN may feedback a CQI value equal to the square amplitude of the quantization error, $\|e_k\|^2$ to eNB. With the feedback $\|e_k\|^2$, the eNB may be able to estimate the expected SINR for each RN with other parameters available at the eNB: $\tilde{g}_{k,1}$ the k-th diagonal element of the lower triangular matrix G, K the number of selected RNs, $N_t$ the number of transmit antennas, and $P_k$ the power allocated to the k-th RN.

After the iteration precoding operation, the matrix $\tilde{Q}(l)$ may be close to an identity matrix as described above, and one element may be nonzero for each row. For example, for each RN, the matrix $\tilde{q}_j^H \tilde{q}_j$ may have one non-zero (unity) element at the intersection of the j-th row and j-th column. Based on such an observation, the estimated SINR may be given when l>1 as follows $$E\{SINR_k(l)\} \geq \frac{|\tilde{g}_{k,1}(l)|^2}{(\|e_k(l)\|^2 - [e_k^H(l) e_k(l)]_{k,k}) + \frac{1}{P_k / \sigma_n^2}} \triangleq \gamma_k^{(l)} \quad \text{(Equation 21)}$$

A RN may also feedback a CQI value equal to $(\|e_k(l)\|^2 - [e_k^H(l) e_k(l)]_{k,k})$ to eNB. With the feedback CQI, a eNB may estimate the sum rate throughput for the l-th iteration by $$R(l) = \sum_{k=1}^{K} \log_2(1 + \gamma_k^{(l)}) \quad \text{(Equation 22)}$$

Numerical Results of an Iterative NLP Method

Figure 5:
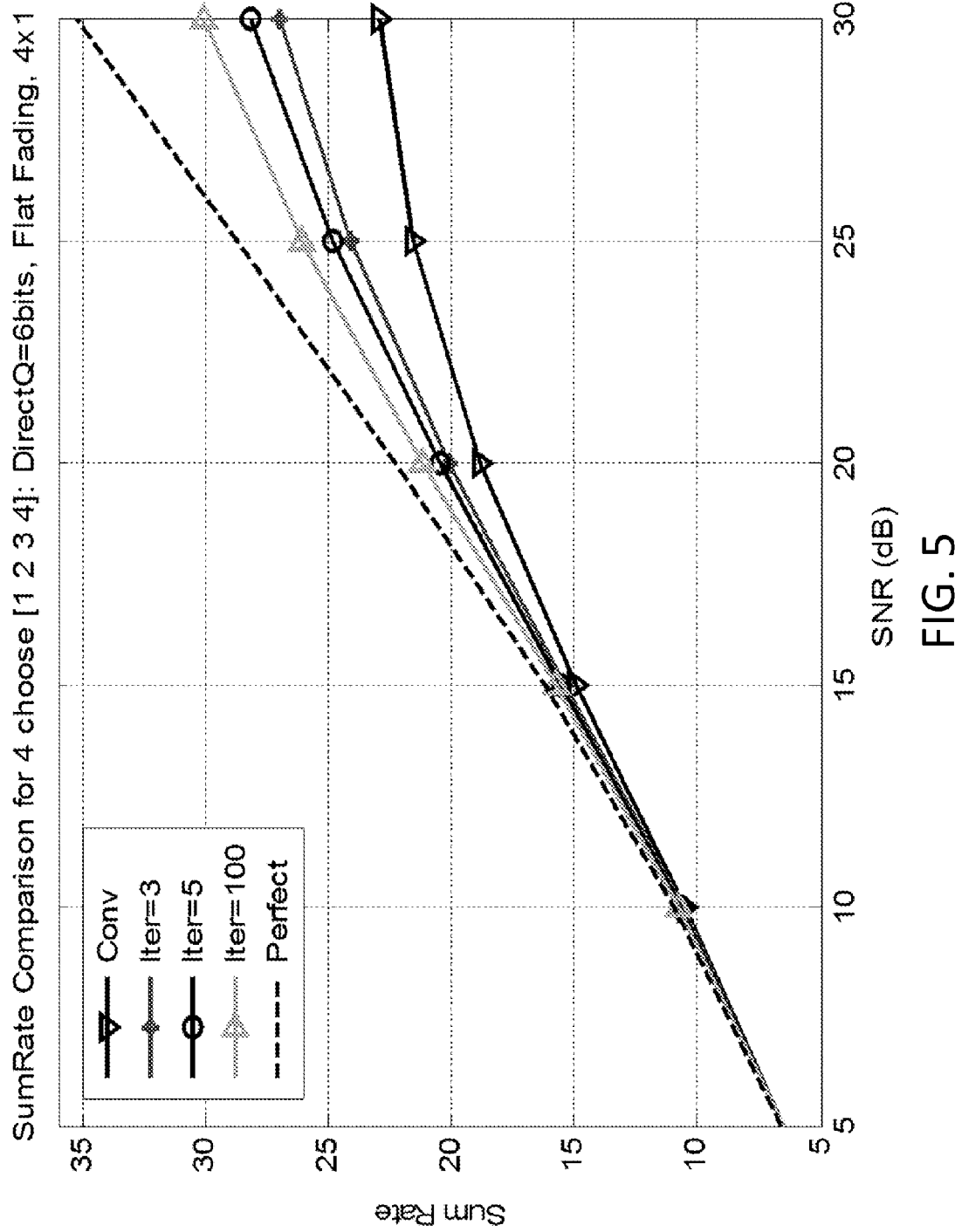
FIG. 5 depicts an example graph showing a sum rate throughput improvement with the iterative NLP.
Figure 6:
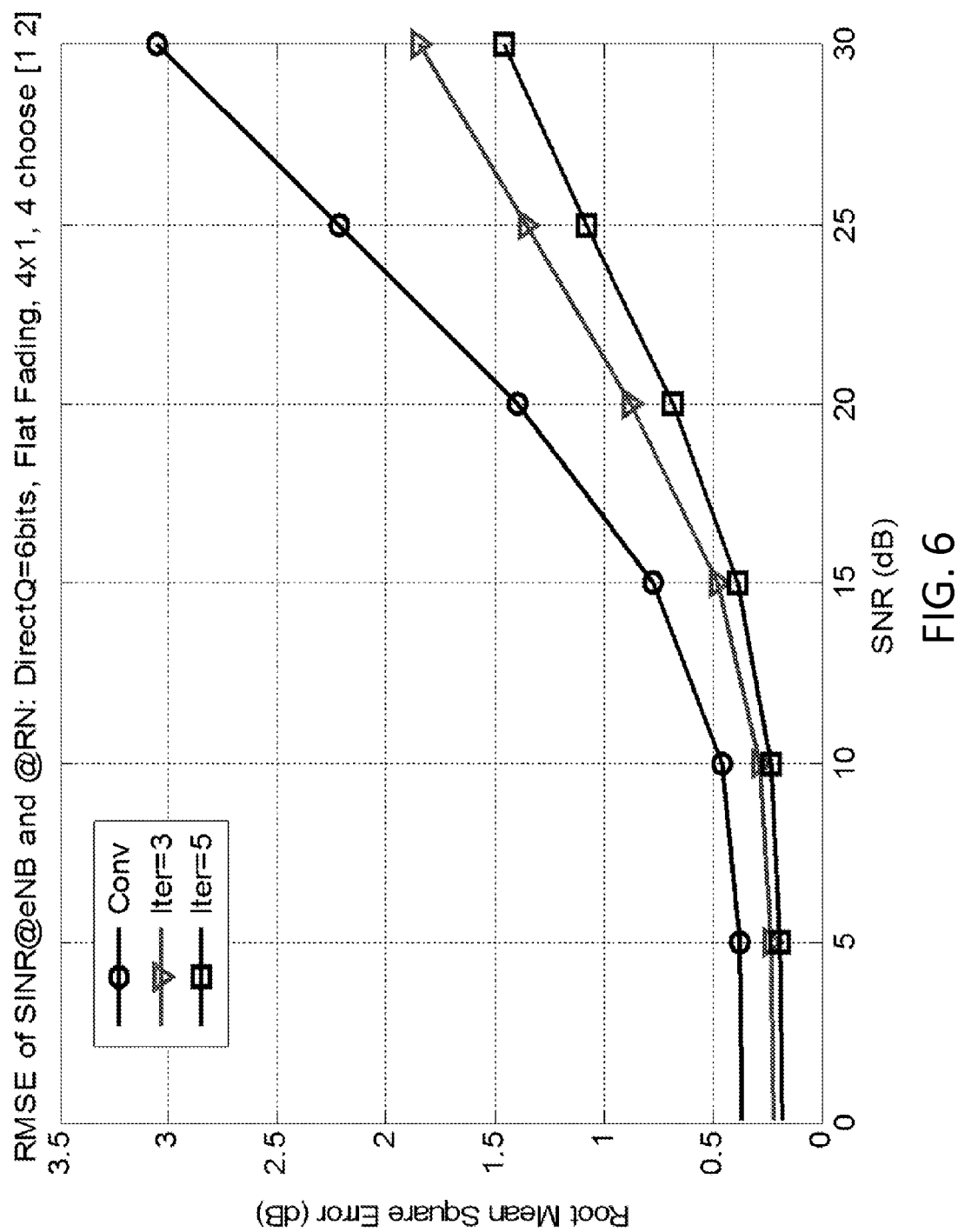
FIG. 6 depicts an example graph showing root mean square error improvement with the iterative NLP.

FIGS. 5 and 6 depict examples of the performance comparison between the proposed scheme and conventional schemes. In the example, we consider MU-MIMO with 4 transmit antennas equipped in eNB, and there are up to 4 UEs each with 1 receive antenna to be scheduled, Direct quantization is employed with 6 bits for each channel coefficient. As shown in FIG. 5, the sum rate throughput increases ~23% (~7 dB) with 3 iterations at an SNR=30 dB, and in FIG. 6, the root MSE of SINR estimated at eNB with reported CQI and that at RN is 1 dB lower by using the iterative NLP with 5 iterations. As such, the proposed iterative NLP may increase RN throughputs, and improve CQI accuracy (e.g. reduce mismatch between SINR at RN and at eNB).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method for implementing iterative nonlinear precoding (NLP) and feedback in a Multi-User Multiple-Input Multiple-Output (MU-MIMO) system, the method comprising:
estimating an effective precoded channel;
quantizing the effective precoded channel;
suppressing quantization errors associated with the quantized effective precoded channel to obtain quantized estimates for the effective precoded channel by scaling up elements at a right interference part or triangular of an effective precoded channel matrix associated with the effected precoded channel to a power level of elements or at a left interference part or triangular of the effective precoded channel matrix before quantization using at least one of the following: a scalar, booster, or a fixed value or number and scaling back the power level of the elements at the right interference part of the effective precoded channel matrix after quantization; and feeding back at least one of the following: the quantized estimates of the effective precoded channel; the quantization errors; a square amplitude of the quantization errors; and a Channel Quality Indicator (CQI) generated based on the quantization error to implement an NLP scheme in the MU-MIMO system to improve spectrum usage efficiencies.

2. The method of claim 1, wherein at least the quantized estimates of the effective precoded channel and the square amplitude of the quantization errors are fed back in a first iteration.

3. The method of claim 2, wherein the CQI is fed back for each iteration after the first iteration.

4. The method of claim 1, wherein the scalar or booster are generated based on feedback in the MU-MIMO system.

5. The method of claim 1, further comprising:
receiving a signal transmitted through a channel matrix, wherein the signal comprises symbols and data generated in response to at least one of: the quantized estimates; the quantization errors; the square amplitude; and the CQI being fed back;
applying a filter to the received signal;
performing a modulo operation on the filtered signal to remap the symbols or data included therein to an original constellation for a subframe; and
detecting the symbols associated with the signal based on a quantizer of the original constellation.

* * * * *